(No Model.)

G. W. MEIGS & J. G. ZIEGLER.
ELASTIC TIRE.

No. 466,613. Patented Jan. 5, 1892.

Witnesses
Ed. A. Keely
Caleb J. Bieber

Geo. W. Meigs
John Geo. Ziegler } Inventors

By their Attorney

UNITED STATES PATENT OFFICE.

GEORGE W. MEIGS AND JOHN GEORGE ZIEGLER, OF READING, PENNSYLVANIA.

ELASTIC TIRE.

SPECIFICATION forming part of Letters Patent No. 466,613, dated January 5, 1892.

Application filed March 17, 1891. Serial No. 385,334. (No model.)

*To all whom it may concern:*

Be it known that we, GEORGE W. MEIGS and JOHN GEORGE ZIEGLER, citizens of the United States, residing at Reading, in the county of Berks and State of Pennsylvania, have invented certain Improvements in Elastic Tires, of which the following is a specification.

This invention relates to improvements in elastic tires such as are most extensively used on bicycles and similar vehicles. Heretofore such tires have been most frequently formed exclusively of rubber; but various attempts have been made to reduce their weight and cost by providing a core of lighter and less expensive material intended to serve, in connection with an outer casing of rubber, the purposes of an elastic tire as satisfactorily as though formed of rubber alone. Rubber tires have also been made hollow to dispense with material not considered essential to secure the proper strength and rigidity of the tire. These various expedients have accomplished their purpose more or less imperfectly, and are generally accompanied by disadvantages which overbalance the benefit gained. Moreover, all elastic tires, whether of solid rubber or otherwise, are comparatively short-lived, because their usefulness is limited by the wear and tear upon the tread portion, which is brought in direct contact with the road-bed, whereby a renewal of the whole tire is made a frequent necessity.

The object of our invention is to provide a novel form of tire which will overcome the disadvantages referred to. The features of its construction are fully described in connection with the accompanying drawings, and are specifically set forth in the claims.

Figure 1:
Figure 2:
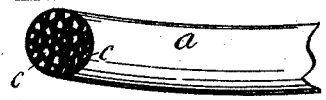
Figure 3:
Figure 4:

Figure 1 represents a portion of our complete tire, a cross-section being shown and also a partial longitudinal section. Figs. 2 and 3 show, respectively, the main composite portion and the rubber tread portion separated. Fig. 4 shows a modified tread portion, and Fig. 5 a modified main portion adapted to be used without the separate tread portion, if desired. Fig. 6 shows another modification.

Our complete tire A is preferably formed as shown in Fig. 1, being made up of separable parts $a$ and $b$. The main portion $a$ we make as follows: Taking a mass of rubber which is in a plastic or semi-liquid state, we thoroughly mix with it by suitable mechanical means small fragments or granules of cork $c$, thus forming a homogeneous mixture or compound. This we form into the desired shape by means of a mold, as usual, and thereafter subject the unfinished product to the curing or vulcanizing process, whereby the required hardness and enduring qualities are imparted to the rubber. This process does not in any way injure the elasticity or porosity of the cork, which qualities, in connection with its light weight, render its use in this connection so satisfactory. It is uniformly distributed throughout the mass and perfectly fills the space which would otherwise be occupied by the rubber, and at the same time changes its form with the rubber when under strain, thus substantially accomplishing all that could be accomplished by solid rubber, while greatly reducing the weight and cost of the tire. The tread portion $b$ is made of rubber alone and is molded so as to have a crescent-shaped cross-section, as shown, the concave face of which corresponds with the main portion $a$, to which it is afterward secured along the dotted line $e$, Fig. 1, by means of suitable cement. The pure-rubber tread thus provided insures wearing qualities at least equal to the solid-rubber tires, and at the same time gives the great advantage of permitting the tread to be renewed, when necessary, independently of the main portion of the tire, the cement used to unite these being adapted to permit the forcible removal of the tread portion, when desired.

In Figs. 1 and 3 we have shown the tread portion hollow, a space $b'$ extending unbrokenly around the whole periphery of the wheel. The object of this construction is to give greater elasticity to the tread, whereby its hold upon the inequalities of the road-bed will be so increased as to prevent the objectionable slippage which frequently occurs with ordinary tires. This open space also tends to prevent cutting of the tread when brought in contact with sharp stones, &c., there being no solid backing, as with ordinary tires, but sufficient yield to prevent any substantial damage. This construction, however, though we consider it highly advantageous, may be dispensed with, and a solid tread, such as shown in Fig. 4, may be used.

Figure 5:
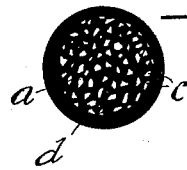
Figure 6:
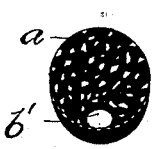

In Fig. 5 we have shown the main portion $a$ adapted to be used alone by merely providing an outer facing $d$ of rubber sufficient to prevent contact of the cork with the road-bed; or, if desired, the crescent-shaped tread may be formed solid with the main portion.

In Fig. 6 the space $b'$ is formed in the main portion $a$ of the tire instead of in the tread portion. These and other modifications will readily suggest themselves.

What we claim is—

1. An elastic tire composed of rubber compounded with fragments or granules of fibrous material, such as cork, so as to form a homogeneous mass, substantially as set forth.

2. An elastic tire composed mainly of rubber compounded with fragments or granules of fibrous material, such as cork, but having a substantially crescent-shaped tread portion of rubber alone, substantially as set forth.

3. An elastic tire composed mainly of rubber compounded with fragments or granules of fibrous material, such as cork, but having a crescent-shaped tread portion of rubber alone, and an intermediate space $b'$, substantially as described.

4. An elastic tire composed of a composite main portion and a pure-rubber tread portion removably secured to said main portion, substantially as set forth.

5. As a new article of manufacture, a rubber tread-band for bicycle-tires formed with a space, as $b'$, located between the tread-surface and the attaching-surface for the main tire, substantially as set forth.

6. The method of manufacturing composite elastic tires, which consists, first, in combining fragments of cork or equivalent material with semi-liquid or plastic rubber; second, in molding the compound into proper shape, and, third, in vulcanizing or hardening the same, substantially as set forth.

In testimony whereof we affix our signatures in presence of two witnesses.

GEORGE W. MEIGS.
JOHN GEORGE ZIEGLER.

Witnesses:
H. P. KEISER,
E. H. JACOBS.